Patented Apr. 20, 1954

2,676,116

UNITED STATES PATENT OFFICE 2,676,116

METHOD OF HARDENING THE DYE-ABSORPTIVE HYDROPHILIC COLLOIDAL LAYER OF A BLANK FILM AND THE PRODUCT THEREOF

Wadsworth E. Pohl, Los Angeles, Calif., assignor to Technicolor Motion Picture Corporation, Hollywood, Calif., a corporation of Maine No Drawing. Application October 17, 1950,
Serial No. 190,647

4 Claims. (Cl. 117—62)

In the art of cinematography it is the practice to harden the dye-absorptive colloidal layer of blank films preparatory to printing of dye transfer and, to this end, the purple form of chromic salts is used. It has been found that such treatment, although effecting a generally satisfactory degree of hardening, produces a poor definition or lack of transfer in the high densities, depending upon the amount of washing following the hardening treatment.

The principal objects of the present invention are to overcome the aforementioned difficulty and to provide an efficient and reliable method of hardening gelatin and like dye-absorptive hydrophilic colloids, which ensures the transfer of an image of good definition and maximum density. Further objects will be apparent from consideration of the following disclosure.

I have found that when the gelatin layer of a photographic blank is treated with a water soluble chromic salt, for example, chromic sulfate or chrome alum, containing both the purple and green forms of chromium, the green form does not combine or react with the gelatin in the same way as does the purple form which produces a hardening action on the gelatin tending to prevent or reduce the rate of dye transfer; but the green form apparently acts as a mordant effective to receive and fix the dye during imbibition transfer without corresponding hardening of the gelatin. Hence, when the gelatin layer is treated with an aqueous chromic salt solution containing the proper amounts of both the purple and green forms, the gelatin is not only hardened to the desired extent, but also is rendered more receptive to dyes, thereby permitting the transfer of an imbibition image of good definition and maximum density.

According to the present invention a blank film having a dye-absorptive hydrophilic colloidal layer, such as gelatin, is subjected to the action of an aqueous solution of chromic salt, such as chromic sulfate ($Cr_2(SO_4)_3 \cdot 18H_2O$), or chrome alum, ($Cr_2(SO_4)_3 \cdot K_2SO_4 \cdot 24H_2O$), containing from 25% to 70% of the green form of chromium and from 75% to 30% of the purple form, the preferred amount of green form being between 60% and 65%. The concentration of the chromium salt may vary from about 40 grams per liter to about 60 grams per liter, the preferred concentration being approximately 50 grams per liter. The pH of the solution may also vary from about 3.0 to about 4.0, the preferred pH being approximately 3.5. The period of treatment and temperature of the treating solution are in general inversely related and depend upon the concentration of the treating solution. As a general rule, the period of treatment may vary from one to three minutes and the temperature of the solution may vary from about 65° F. to about 75° F. However, it is advisable, if not necessary, to make empirical determinations of these factors in order to obtain optimum results for a selected type of colloid.

The treating solution may be prepared either by heating a chromic salt solution to a temperature between approximately 170° F. and 190° F. and holding the temperature until the desired amount of the green form has been produced, or by mixing separately prepared solutions of the green form and the purple form. According to the latter procedure the purple form may be prepared by dissolving the chromic salt in ice water which gives a solution of 100% purple chromium, and the green form may be prepared by dissolving the chromic salt in water and then boiling the solution for about one-half hour, thereby producing a solution of 100% green chromium.

In any case the ratio of the purple to green chromium in the treating solution may be determined colorimetrically and, to this end, separate solutions of the purple and green forms are prepared and a series of known mixtures of the two forms are made to provide standards of comparison. Since the color of a chromic salt solution containing both forms of chromium varies in accordance with the amount of green chrome present, comparison of such a solution with the standards gives a reasonably accurate indication of the amount of green chrome present in an unknown solution.

After having subjected the colloidal layer to the above-described treatment, it is then washed with water to remove all unreacted chromic compounds, thus stabilizing the colloid against progressive hardening. The hardened colloid is thus made ready for imbibition printing or dye transfer in accordance with any of the several known procedures.

A specific example of hardening a blank cinematographic film having a gelatin layer in accordance with what is now considered a preferred procedure is as follows:

An aqueous chrome alum $$(Cr_2(SO_4)_3 \cdot K_2SO_4 \cdot 24H_2O)$$

solution having a concentration of about 52.50 grams per liter and containing from 60 to 65% green chromium is first prepared as above described, the pH of the solution being adjusted to about 3.5±0.2 by the addition of ammonia. The film to be treated is immersed in or run through one or more tanks of the treating solution maintained at a temperature of about 70° F., after which the film is run through one or more tanks of water to remove unreacted chromic salt, the rate of travel of the film and number and size of the tanks being such as to give an immersion period in the chromic salt solution of about one and one-half minutes and in the wash water of about one minute which has been found sufficient to remove unreacted soluble chromic salts, thereby stabilizing the gelatin layer against progressive hardening.

In order to avoid depletion of the green chrome in the solution layer next to the film under treatment, the treating solution should be continuously agitated. Usually the agitation produced by a film traveling at the rate of 120 to 150 feet per minute is adequate, but the use of a stirrer or other agitator may be advisable. When treating great lengths of photographic film, it is necessary to compensate for depletion of the chromic salts, particularly the green form, and, to this end, it is necessary to make periodic determinations of the relative proportions of the green and purple forms in the treating solution and replenish the depleted components by the addition of sufficient quantities of the separately prepared solution in amounts sufficient to maintain the specified proportions and concentration of chromic salts.

After drying, the washed film is ready for imbibition dye transfer in accordance with the usual procedures, the hardening treatment being effective to insure a greatly improved transfer of the dye in the shadows and a consequent excellent definition.

While I have shown and described one desirable embodiment of the invention, it is to be understood that this disclosure is for the purpose of illustration and that various changes and modifications may be made without departing from the spirit and scope of the invention as set forth in the appended claims.

I claim:

1. For hardening the dye-absorptive colloidal gelatin layer of a blank film preparatory to dye transfer thereto, the method which comprises subjecting the colloidal layer to treatment with an approximately 5% aqueous solution of an ionized chromic salt of an inorganic acid selected from the group consisting of chrome alum and chrome sulfate, said solution having a pH value of approximately 3 to 4 and consisting essentially of 25% to 70% chromic salt in the green ionized form and from 75% to 30% in the purple ionized form, said treatment being for a period between approximately one and three minutes and at a temperature between about 65° F. and 75° F., and thereafter washing out the unreacted chromic salts.

2. For hardening the dye absorptive colloidal gelatin layer of a blank film preparatory to dye transfer thereto, the method which comprises subjecting the colloidal layer to treatment with an approximately 5% aqueous solution of chrome alum having a pH of approximately 3.5 and containing from 60% to 65% of the chrome alum in the green ionized form and from 35% to 40% in the purple ionized form, said treatment being for a period of about 1½ minutes and at a temperature of about 70° F., and thereafter washing out the unreacted compounds.

3. For hardening the dye absorptive colloidal gelatin layer of a blank film preparatory to dye transfer thereto, the method which comprises subjecting the colloidal layer to treatment with an approximately 5% aqueous solution of chrome sulfate having a pH of approximately 3.5 and containing from 60% to 65% of the chrome sulfate in the green ionized form and from 35% to 40% in the purple ionized form, the treatment being for a period of about 1½ minutes and at a temperature of about 70° F., and thereafter washing out the unreacted compounds.

4. A photographic blank film having a chrome hardened layer of gelatin made by the method of claim 1.

References Cited in the file of this patent

UNITED STATES PATENTS

| Number | Name | Date |
| --- | --- | --- |
| 2,046,320 | Burbank | July 7, 1936 |
| 2,359,217 | Hollander | Sept. 26, 1944 |

OTHER REFERENCES

British Journal of Photography, Jan. 27, 1911, pp. 59–61.